(12) United States Patent
Herke (10) Patent No.: US 10,239,409 B2
(45) Date of Patent: Mar. 26, 2019

(54) ENERGY SUPPLY SYSTEM FOR A MOTOR VEHICLE

(71) Applicant: Dr. Ing. h.c. F. Porsche Aktiengesellschaft, Stuttgart (DE)

(72) Inventor: Dirk Herke, Kirchheim unter Teck (DE)

(73) Assignee: Dr.Ing. h.c.F. Porsche Aktiengesellschaft (DE)

( * ) Notice: Subject to any disclaimer, the term of this patent is extended or adjusted under 35 U.S.C. 154(b) by 108 days.

(21) Appl. No.: 15/169,826

(22) Filed: Jun. 1, 2016

(65) Prior Publication Data

US 2016/0355096 A1 Dec. 8, 2016

(30) Foreign Application Priority Data

Jun. 3, 2015 (DE) .................. 10 2015 108 789

(51) Int. Cl.
*H02J 7/00* (2006.01)
*H02J 7/04* (2006.01)
*B60L 11/18* (2006.01)

(52) U.S. Cl.
CPC ....... *B60L 11/1818* (2013.01); *B60L 11/1811* (2013.01); *B60L 11/1838* (2013.01); *H02J 7/0026* (2013.01); *B60L 2210/14* (2013.01); *Y02T 10/7005* (2013.01); *Y02T 10/7072* (2013.01); *Y02T 10/7225* (2013.01); *Y02T 90/121* (2013.01); *Y02T 90/127* (2013.01); *Y02T 90/128* (2013.01); *Y02T 90/14* (2013.01); *Y02T 90/163* (2013.01)

(58) Field of Classification Search
USPC ............... 320/107, 108, 109, 104, 137, 138; 307/9.1
See application file for complete search history.

(56) References Cited

U.S. PATENT DOCUMENTS

| | | | |
|---|---|---|---|
| 2008/0215200 A1 | 9/2008 | Toth | |
| 2009/0121659 A1* | 5/2009 | Oyobe | B60K 6/365 318/12 |
| 2010/0231169 A1 | 9/2010 | Hashim et al. | |
| 2011/0148353 A1 | 6/2011 | King et al. | |
| 2011/0267004 A1* | 11/2011 | Krauer | B60L 11/1875 320/109 |

(Continued)

OTHER PUBLICATIONS

German Search Report dated Feb. 19, 2016.

*Primary Examiner* — Alexis Pacheco
(74) *Attorney, Agent, or Firm* — Gerald E. Hespos; Michael J. Porco; Matthew T. Hespos (57) ABSTRACT

An energy supply system for supplying at least first and second components of a motor vehicle with electrical energy. The energy supply system is arranged in the motor vehicle and has a charging socket (60). At least the first component an energy store and at least the second component is a consumer. The at least one first component has a first electrical voltage and the at least one second component has a second electrical voltage. To carry out a charging mode, the motor vehicle is connected via the charging socket (60) to a charging station with which current which either has the first or the second electrical voltage is to be made available. A first charging mode, a second charging mode and a travel mode of the motor vehicle can be carried out with the energy supply system (52).

8 Claims, 8 Drawing Sheets

(56) References Cited

U.S. PATENT DOCUMENTS

2014/0354195 A1* 12/2014 Li .................. B60L 11/1816
                                                    318/139
2015/0042159 A1    2/2015 Kim et al.
2016/0355096 A1* 12/2016 Herke ............... B60L 11/1818

* cited by examiner

ENERGY SUPPLY SYSTEM FOR A MOTOR VEHICLE

CROSS REFERENCE TO RELATED APPLICATION

This application claims priority under 35 USC 119 to German Patent Appl. No. 10 2015 108 789.8 filed on Jun. 3, 2015, the entire disclosure of which is incorporated herein by reference.

BACKGROUND

1. Field of the Invention

The invention relates to an energy supply system for a motor vehicle and to a method for supplying at least one component of a motor vehicle with electrical energy.

2. Description of the Related Art

A motor vehicle that has an electric motor for driving typically is embodied as an electric vehicle or hybrid vehicle and has an electrical energy store, such as a high-voltage battery. Electrical energy is supplied from the electrical energy store to the electric motor and the electric motor converts the electrical energy into mechanical energy. The electrical energy store may be supplied with electrical energy, and therefore charged, via an electrical charging station. A voltage of the electrical energy store may differ from a voltage of the charging station. Thus, to charge the electrical energy store it is necessary to transform the voltage of the charging station to the voltage of the electrical energy store.

US 2008/0215200 discloses a control system for a hybrid vehicle having a reconfigurable multifunctional power converter. US 2009/0121659 discloses a charge control device for an electrically driven motor vehicle and a control method for storing electrical energy. US 2010/0231169 discloses a motor vehicle with an electrical storage device that can be charged and discharged. US 2011/0148353 discloses a device for quickly charging an energy store of a motor vehicle. US 2014/0354195 discloses a system for switching between a charging and discharging function and a travel function of an electrical vehicle. US 2015/0042159 discloses a device for converting electrical energy for an electrical vehicle.

Against this background, an object of the invention is to supply an electrical energy store and an electrical consumer of a motor vehicle with electrical energy independently of a respective voltage.

SUMMARY

The invention relates to an energy supply system in a motor vehicle that has a charging socket. The energy supply system is designed to supply at least first and second components of a motor vehicle with electrical energy. The at least one first component is an energy store and the at least one second component is a consumer. The at least one first component has a first electrical voltage, and the at least one second component has a second electrical voltage. The motor vehicle can be connected via the charging socket to a charging station to carry out a charging mode. Current is made available by the charging station, either as the first or the second electrical voltage according to the refinement of the charging station. If the charging station has the first voltage, the energy supply system is designed in a first charging mode to transmit current from the charging socket directly to the at least one first component. If the charging station has the second voltage, the energy supply system is designed in a second charging mode to transform current from the charging socket from the second voltage to the first voltage and to transmit the current to the at least one first component. Furthermore, the energy supply system is designed, in the second charging mode, to transmit the current from the charging socket directly to the at least one second component. In a travel mode of the motor vehicle, the energy supply system is designed to transform current from the at least one first component from the first voltage to the second voltage and to transmit the current to the at least one second component.

The first voltage may be either higher or lower than the second voltage.

The energy supply system may comprise at least one voltage transformer, for example a bidirectional and/or unidirectional voltage transformer that is designed to transform current, for example direct current, from one of the two voltages to the other voltage, and vice versa. The at least one voltage transformer can be DC coupled.

In one refinement, current is to be converted by increasing the voltage from the second voltage to the first voltage or by reducing the voltage from the first voltage to the second voltage, and therefore to be transformed using the at least one voltage transformer. If the first voltage is lower than the second voltage, the at least one bidirectional and/or unidirectional voltage transformer is used to increase current from the first voltage to the second voltage and/or to reduce current from the second voltage to the first voltage.

The at least one voltage transformer has a first input and a first output as well as a second input and a second output.

In this context, the first input and the first output are connected to one another via a first path, whereas the second input and the second output are connected to one another via a second path. A coil and a first active switching element are arranged along the first path. Furthermore, the first and second paths are connected to one another via a second active switching element and a capacitor.

In one refinement, a third active switching element is arranged along the second path.

At least one protective switch along one of the paths may be a semiconductor switch, such as a field-effect transistor or bipolar transistor with an integrated gate electrode (IGBT). Furthermore, at least one active switching element can be a diode or can comprise a diode. In this context, a diode is connected in parallel with a semiconductor switch, usually if the semiconductor switch is arranged along the first path.

The first input of the at least one voltage transformer may be connected via a first line to a first output of the charging socket, and the second input of the voltage transformer may be connected via a second line to a second output of the charging socket. The outputs of the at least one voltage transformer are connected via at least one further line to the at least one first component of the motor vehicle.

The first line may have a first node via which the first line is connected to the at least one second component. The second line may have a node via which the second line is connected to the at least one second component. An electrical, mechanical or electromechanical protective switch may be between the first output of the charging socket and the first node along the first line. Furthermore, an electrical and/or mechanical protective switch may be arranged along the second line.

An electrical and/or mechanical protective switch may be arranged between the first node along the first line and the at least one second component.

The first line also may have a second node via which the first line is connected to the at least one first component. An electrical and/or mechanical protective switch may be arranged between the second node and the at least one first component.

The energy supply system optionally has at least one charging device between the charging socket and the at least one first component. An alternating current is to be transformed and/or converted into a direct current using this at least one charging device. Alternating current and direct current generally are isolated electrically in the at least one charging device.

The invention also relates to a method for supplying at least first and second components of a motor vehicle with electrical energy via an energy supply system of the motor vehicle. The first component is an energy store and at least one second component is a consumer. The at least one first component has a first electrical voltage or a first voltage level, and the at least one second component has a second electrical voltage or a second voltage level. To carry out a charging mode, the method comprises connecting the motor vehicle to a charging station via a charging socket of the energy supply system. The charging station makes current available at either the first or the second electrical voltage. If the charging station has the first voltage, current is transmitted, in a first charging mode with the energy supply system, from the charging socket to the at least one first component. If the charging station has the second voltage, current from the charging socket is transformed, in a second charging mode with the energy supply system, from the second voltage to the first voltage and is transmitted to the at least one first component. In this context, the current from the charging socket may be transmitted to the at least one second component. In a travel mode of the motor vehicle with the energy supply system, current from the at least one first component is transformed from the first voltage to the second voltage and is transmitted to the at least one second component.

The first voltage usually is higher than the second voltage, but may be lower than the second voltage.

The method may include transforming the current from one of the two voltages to the other voltage, and/or vice versa with at least one bidirectional and/or unidirectional voltage transformer. In this context, direct current is converted with the at least one bidirectional and/or unidirectional voltage transformer.

In the first charging mode, the method includes transmitting current from the charging socket directly via a closed protective switch, that is otherwise open, to the at least one first component.

In the second charging mode, the method includes transforming current from the charging socket from the second voltage to the first voltage by the at least one voltage transformer and transmitting the current to the at least one first component. The current from the charging socket is transmitted directly via a closed protective switch, that is otherwise open, to the at least one second component.

Furthermore, in the travel mode, the method includes using the at least one voltage transformer for transforming the current from the at least one first component from the first voltage to the second voltage and transmitting the current to the at least one second component.

The described energy supply system and the described method are provided for a motor vehicle that has at least one electric machine for driving the vehicle. The electric machine is to be supplied with electrical energy by the electrical energy store as the at least one first component, for example a high-voltage battery or a DC traction battery. The at least one electrical energy store has the first, high, DC voltage of, for example, 600 V or 800 V.

To charge the at least one electrical energy store in turn with electrical energy, the energy supply system of the motor vehicle is connected electrically to the charging station, for example a fixed charging pillar. This fixed charging pillar converts alternating current from the fixed power supply system into direct current via an alternating current/direct current converter that is integrated in the charging pillar. However, if the voltage of the electrical energy store of the motor vehicle differs from the voltage of the charging pillar, a voltage of the charging pillar corresponds to a second low voltage of, for example, 400 V or 600 V, the energy supply system of the motor vehicle has the at least one voltage transformer, such as an electrical booster or voltage booster, with which the second low voltage of the charging pillar is to be transformed to the first, high voltage of the electrical energy store.

The two different voltages are to be defined in a variable fashion by respective voltage intervals. In this context, a voltage interval comprises a minimum value of, for example, 200 V or 400 V and a maximum value of 600 V, 700 V, 800 V, 1000 V or more. Values of the two voltages depend on the components of the motor vehicle that are to be supplied with electrical energy and on the charging station whose possible voltage is, for example, country-specific.

In the case of a motor vehicle without such a voltage transformer, additionally separate electrical and/or mechanical protective switches are provided with which a charging socket of the motor vehicle is to be switched to a voltage-free state. However, the energy supply system of the invention has a voltage transformer integrated therein and has at least one switching protection module, for example at least one active switching element and/or an electrical and/or mechanical protective switch. Thus, the additional separate protective switches described above can be dispensed with.

Further components, usually consumers, of the motor vehicle that are to be operated at the second, low voltage, also from the at least one electrical energy store at the first, high voltage, can also be supplied with electrical energy by the voltage transformer, if the at least one voltage transformer is embodied in a bidirectional fashion.

In one refinement it is therefore possible to supply the electrical energy store of the motor vehicle by means of the energy supply system from a charging station or charging pillar that has a lower voltage than the electrical energy store, the same voltage as the electrical energy store, or possibly a higher voltage than electrical energy store of the motor vehicle. Furthermore, a consumer of the motor vehicle whose voltage differs from the voltage of the electrical energy store of the motor vehicle, for example is lower, is also to be supplied with electrical energy with the energy supply system, usually using the voltage transformer.

The voltage transformer or booster can be operated "forward" to charge the electrical energy store of the motor vehicle with electrical energy from the charging station that may have a lower voltage than the electrical energy store of the motor vehicle, depending on the definition. However, if a consumer of the motor vehicle is to be supplied with electrical energy from the electrical energy store of the motor vehicle with a lower voltage than said electrical energy store, the voltage transformer is to be operated "backward" according to the definition.

The voltage transformer usually is embodied in a bidirectional fashion and is connected directly to the charging socket of the energy supply system. Furthermore, if the voltage of the charging station is lower than that of the electrical energy store, the current that is made available by the charging station is to be stepped up, for example with a pulse-duty factor of 50%, with the voltage transformer. In this context, those consumers of the motor vehicle that have the same voltage as the charging station are connected directly thereto, but disconnected from the voltage transformer. In this respect, the consumers are connected via protective switches to the charging socket, the voltage transformer and the electrical energy store of the motor vehicle. In one embodiment of the method, the consumers of the motor vehicle each are to be disconnected, depending on the demand, from the charging socket, the voltage transformer and/or the electrical energy store of the motor vehicle by opening at least one protective switch, or to be connected to the charging socket, the voltage transformer and/or the electrical energy store by closing at least one protective switch.

Such a consumer is usually at least one component of an air-conditioning system and typically is a cooling device or heating device. In one refinement, the voltage transformer has a plurality of voltage transformer modules, for example four to six, that are connected in parallel and whose number is independent of the transformation between two voltages that is to be performed. With the method it is therefore possible to adapt a voltage of at least one component of the motor vehicle to a respective voltage of a charging station.

Further advantages and refinements of the invention can be found in the description and the appended drawing.

Of course, the features which are mentioned above and those which are still to be explained below can be used not only in the respectively specified combination but also in other combinations or alone without parting from the scope of the present invention.

The invention is illustrated schematically in the drawings by means of embodiments and is described schematically and in detail with reference to the drawings.

DETAILED DESCRIPTION

The figures are described in a coherent and comprehensive fashion. Identical reference numbers denote identical components.

Figure 1:
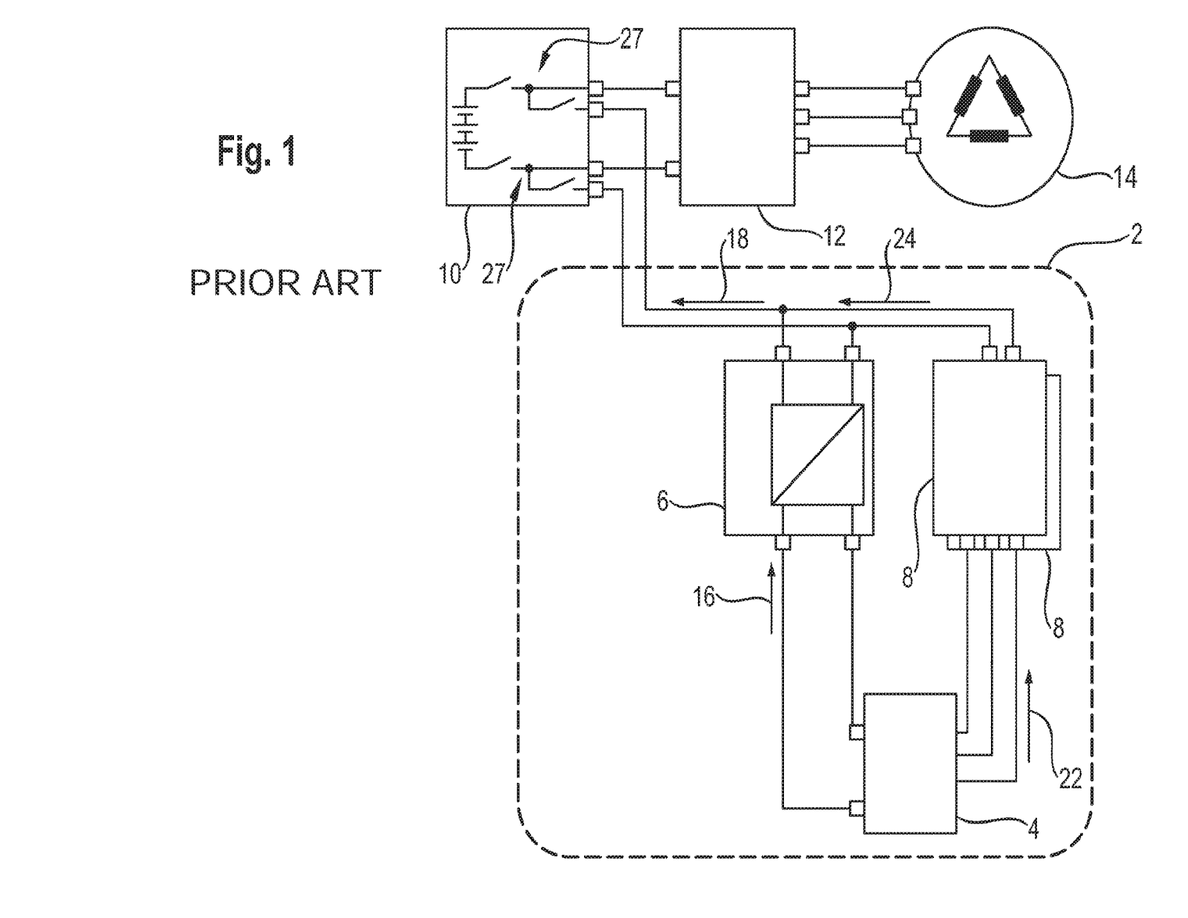
FIG. 1 is a schematic illustration of a first prior art electrical charging system of a motor vehicle.

The motor vehicle charging system 2 shown in FIG. 1 comprises a charging socket 4, a voltage transformer 6 and two charging devices 8. This charging system 2 is embodied as a component of the motor vehicle. In FIG. 1, a battery 10, power electronics 12 and an electric motor 14 are illustrated schematically as further components of the motor vehicle.

The voltage transformer 6 is embodied here as what is referred to as a 400 V DC booster without electrical isolation and therefore with DC coupling. There is provision here that the voltage transformer 6 has an efficiency level of at least 98% in a power range from 50 to 150 kW. An installation space of the voltage transformer 6 is approximately 6 l. Furthermore, the voltage transformer 6 is embodied neutrally in terms of installation space with respect to the two charging devices 8, which each have a power of 11 kW.

The battery 10 of the motor vehicle in this example has a voltage of 800 V. The battery 10 is at least partially or, under certain circumstances, completely discharged after a relatively long journey or for other reasons and must be supplied with electrical energy. For this purpose, the motor vehicle must drive to a charging station that makes available both a direct current and an alternating current at a second, low voltage of 400 V. To charge the battery 10, the charging socket 4 is connected to the charging station. A portion of the electrical energy from the charging station is transmitted to the voltage transformer 6 (arrow 16) as direct current of approximately 330 to 350 A. The direct current or the electrical energy with the second low voltage of 400 V is transformed to the first, high voltage of 800 V by the voltage transformer 6. The direct current that is flowing here has a current strength of 200 A (arrow 18). This electrical energy is transmitted on to the battery 10.

Furthermore, an alternating current with a current strength of usually 3 to 32 A is made available to the two charging devices 8 from the charging socket 4 (arrow 22). A direct current with a current strength of 28 A and with the first high voltage of 800 V is made available from the alternating current from the two charging devices 8 (arrow 24). This direct current also is transmitted from the two charging devices 8 to the battery and is superimposed on the direct current that is made available by the voltage transformer 6 (arrow 18).

For protection, the battery 10 has two protective switches 27. In the travel mode of the motor vehicle, electrical energy is transmitted to the electric motor 14 from the battery 10 via the power electronics 12, which have a power of 320 kW.

The voltage transformer 6 is a 400 V DC booster with a booster power of 150 kW. An input voltage range of the voltage transformer 6 is 200 to 600 V, whereas an output voltage range is 600 to 1000 V.

Figure 2:
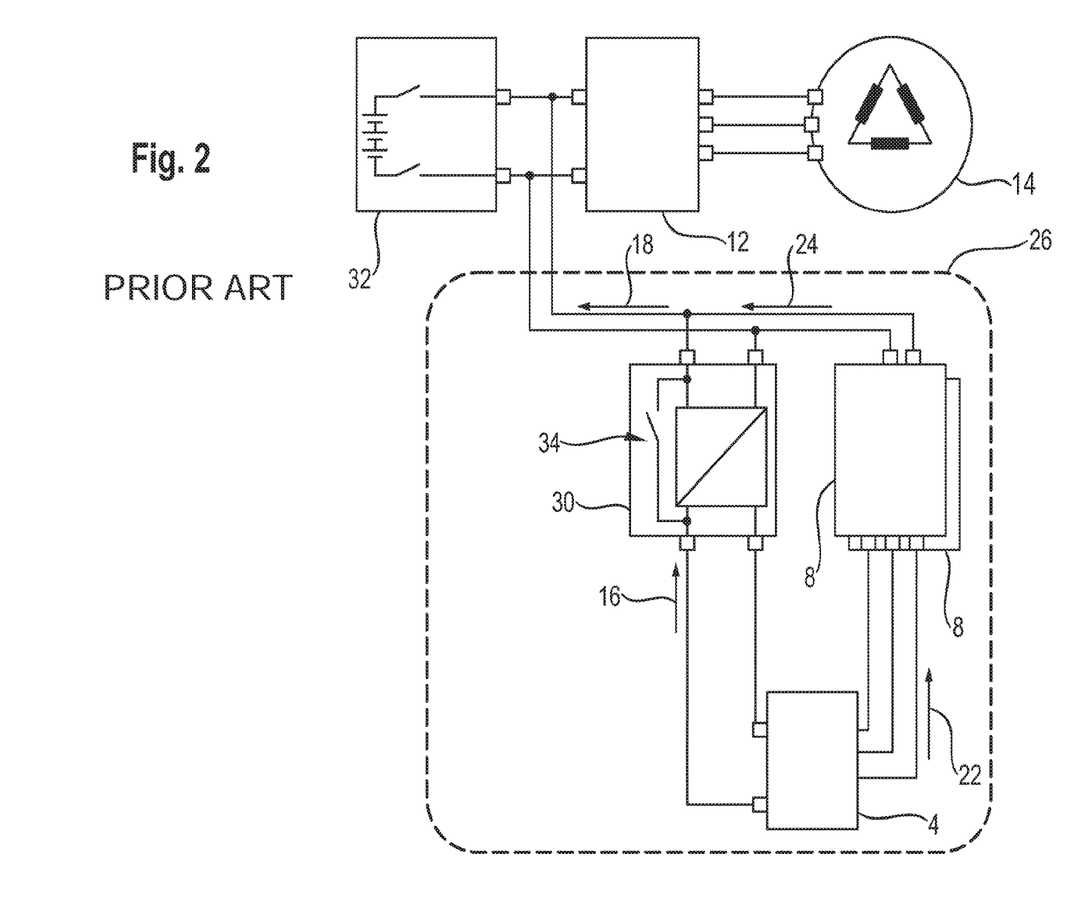
FIG. 2 is a schematic illustration of a second prior art electrical charging system for a motor vehicle.

The second example of a motor vehicle charging system 26 that is illustrated in FIG. 2 differs from the first example of the charging system 2 of FIG. 1 by having a further example of a voltage transformer 30. In addition, a battery 32 of FIG. 2 differs from the battery 10 of FIG. 1. The arrangement illustrated schematically in FIG. 2 has a 400 V DC booster as the voltage transformer 30 and has a protective switch 34, whereas in the battery 32 of the motor vehicle, protective switches 27 are dispensed with, in contrast to an arrangement of FIG. 1.

Figure 3:
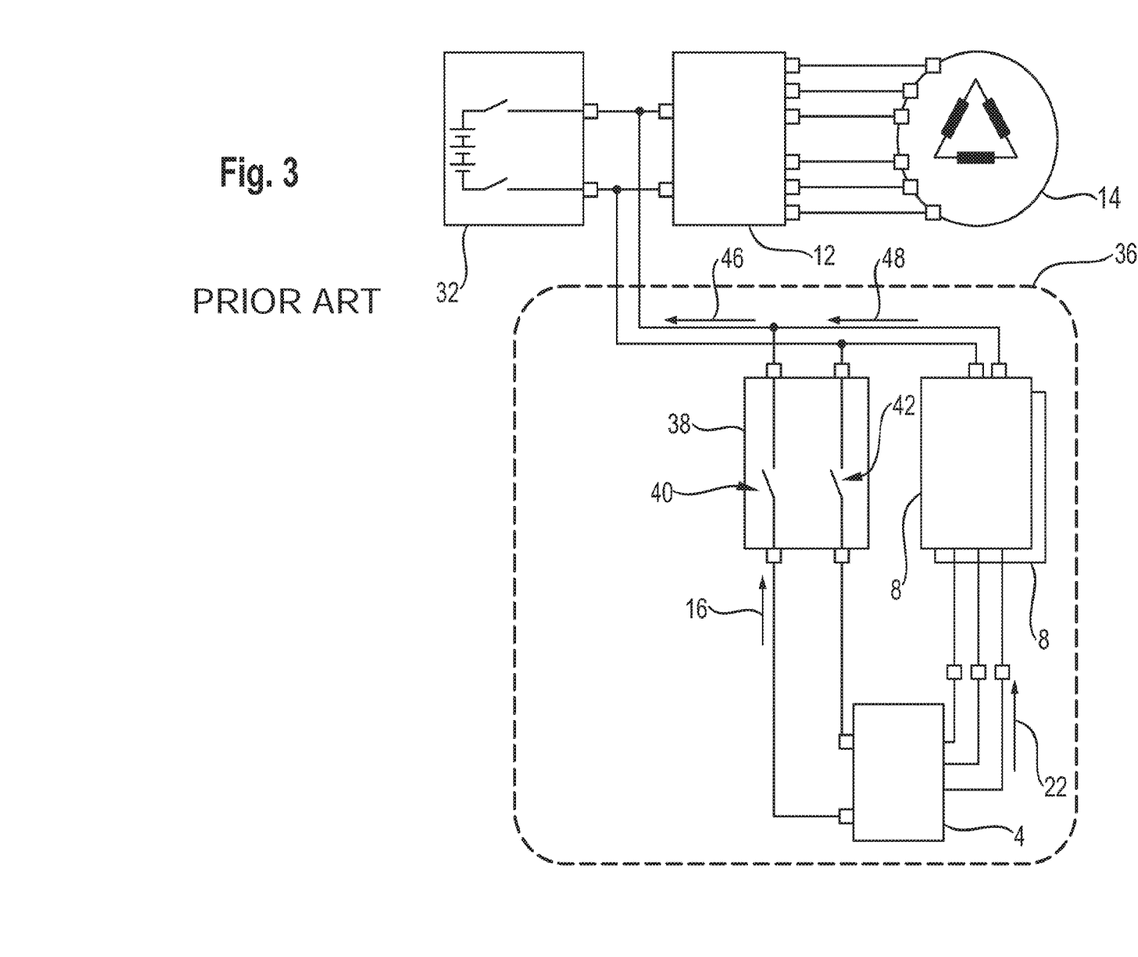
FIG. 3 is a schematic illustration of a third prior art electrical charging system for a motor vehicle.

The third example of a charging system 36 which is illustrated schematically in FIG. 3 differs from the two charging systems 2, 26 presented above in that, instead of a voltage transformer 6, 30, it has a protection device 38 with two protective switches 40 (S1) and 42 (S2) that are connected in parallel with one another, wherein the first protective switch 40 is optional. Furthermore, the arrangement illustrated in FIG. 3 has two electric motors 14 to be supplied with electrical energy from a battery 32 of the motor vehicle.

A direct current with a current strength of 400 A and a voltage of 400 V (arrow 46) is made available to the battery 32 via the protection device 38. Furthermore, during charging by the two charging devices 8, a direct current with a current strength of 55 A and a voltage of 400 V (arrow 48) can be made available to the battery 32.

According to the standard for plug types IEC61851 (as at 2015), during quick charging of the battery 32 with direct current it is not unambiguously defined here whether a positive direct current pole or a negative direct current pole is to be disconnected for such a charging process so that the charging socket 4 is switched to a voltage-free state. The charging system of FIG. 3 is operative so that at least one of the two protective switches 40, 42 of the protection device 38 is to be opened. Furthermore, as is presented with respect to FIG. 1, it is possible also to integrate a corresponding protective switch 27 directly in a battery 10.

Figure 4A:
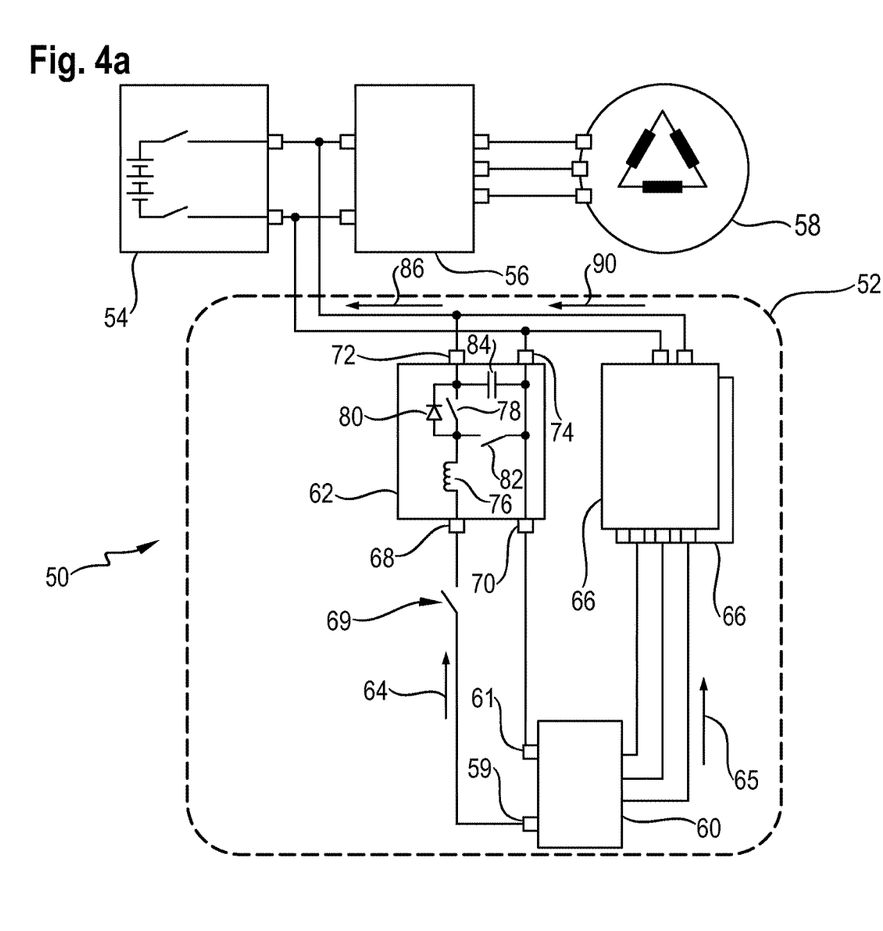
FIGS. 4a and 4b are schematic illustrations of a first example of an arrangement for a motor vehicle with a first embodiment of the energy supply system according to the invention.

The first example of the motor vehicle arrangement 50 illustrated schematically in FIG. 4a comprises the first embodiment of an energy supply system 52 according to the invention as a first component of the motor vehicle. Further components of the motor vehicle include an electrical energy store 54, embodied as a battery with a first, high voltage of 800 V here, power electronics 56 with a power of 320 kW and an electric machine 58. The electric machine 58 is designed to drive or move the motor vehicle, which is an electric vehicle or hybrid vehicle. For this purpose, in a travel mode of the motor vehicle electrical energy is made available to the electric machine 58 from the energy store 54 via the power electronics 56.

To carry out a charging mode, the motor vehicle is to be moved to a charging station (not illustrated here), and a charging socket 60 of the energy supply system 52 is to be connected to the charging station. This charging socket 60 has a first output 59 (positive pole) and a second output 61 (negative pole). During the charging process a first amount of electrical energy is transmitted from the charging socket 60 to a DC coupled voltage transformer 62 of the energy supply system 52. A direct current for transporting this electrical energy has a current strength of 330 A (arrow 64). The energy supply system 52 has, as further optional components, two electrically isolated charging devices 66 with a respective power of 11 kW. These charging devices 66 are on-board charging devices, and each optionally comprises a power communication path (Power Line Communication, PLC).

The variant of a voltage transformer 62 presented in FIG. 4a comprises a first input 68 and a second input 70. In this context, the first input 68 of the voltage transformer 62 is connected to the first output 59 of the charging socket 60. An electrical and/or mechanical protective switch 69 is arranged along a line between the first output 59 and the first input 68, with which protective switch 69 the line for transporting the current between the first output 59 of the charging socket 60 and the first input 68 of the voltage transformer 62 is either to be opened or closed. The second input 70 of the voltage transformer 62 is connected to the second output 61 of the charging socket 60. Furthermore, the voltage transformer 62 comprises a first output 72 and a second output 74.

Within the voltage transformer 62, a first path, along which a coil 76 and a first semiconductor switch 78 are arranged as an active switching element, extends between the first input 68 and the first output 72. Furthermore, a diode 80 is connected in parallel with the semiconductor switch 78. The semiconductor switch 78 and the diode 80 together form an active switching element. In an alternate refinement, the diode 80 is integrated in the semiconductor switch 78. A second path of the voltage transformer 62 extends between the second input 70 and the second output 74. Furthermore, this second path is connected via a second semiconductor switch 82 as an active switching element to a node between the coil 76 and to the first semiconductor switch 78 along the first path, and via a capacitor 84 to a node between the first semiconductor switch 78 and the diode 80 along the first path and to the first output 72 of the voltage transformer 62.

During the charging process, the direct current with a current strength of 330 A (arrow 64) and a direct voltage of 400 V or 800 V, depending on the voltage of the charging station at which the charging socket 60 is arranged, is made available to the first input 68 of the voltage transformer 62 by the first output 59 of the charging socket 60. Direct current with a current strength of 200 A and a voltage of 800 V is made available here to the electrical energy store 54 from the first output 72 of the voltage transformer 62 (arrow 86).

Furthermore, in the charging process, an alternating current with a current strength of 3 to 32 A is made available to the two charging devices 66 from the charging socket 60 (arrow 65). In addition, a direct current with a current strength of 28 A and a voltage of 800 V is made available to the electrical energy store 54 by the two charging devices 66 (arrow 90).

Figure 4B:
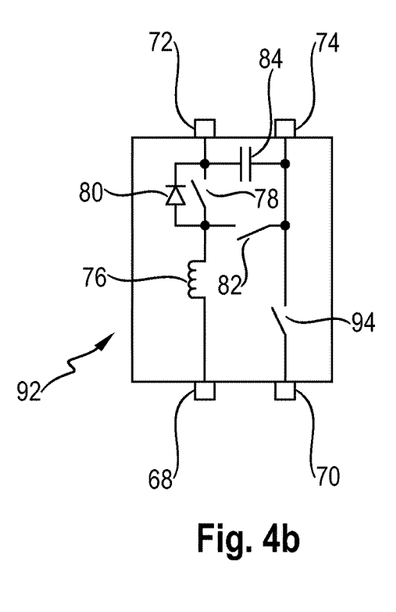

FIG. 4b shows a variant of a voltage transformer 92, which is a 400 V booster with a power of 150 kW, and which, within the embodiment of the energy supply system 52 can be used as an alternative to the voltage transformer 62 shown in FIG. 4a. The variant of the voltage transformer 92 illustrated schematically in FIG. 4b differs from the variant of the voltage transformer 62 of FIG. 4a by having an additional component, specifically a third semiconductor switch 94 as an active switching element arranged along the second path of the voltage transformer 92, parallel to the coil 76 along the first path between the first input 68 and the first output 72.

By providing the active switching elements, embodied as semiconductor switches 78, 82, 94, in a respective voltage transformer 62, 92, it is ensured that the charging socket 60 is voltage-free in the travel mode of the motor vehicle, with the result that it is possible to dispense with further protective switches. At least one such semiconductor switch 78, 82, 94 is embodied, for example, as an FET or IGBT. If redundant deactivation should be required in addition to the safety of use, it is possible, as shown with reference to the voltage transformer 92 in FIG. 4b, to provide the additional integrated semiconductor switch 94 as an active switching element along the second path between the second input 70 and the second output 74. However, as illustrated in FIG. 4a, this semiconductor switch 94 is optional. In one refinement it is possible, instead, to arrange an electrical and/or mechanical protective switch 71 along a line between the second output 61 and the second input 70, as indicated in FIGS. 5 and 6a.

The charging socket 60 of the arrangement 50 and therefore of the energy supply system 52 may be connected to a charging station that has a voltage of 400 V. To charge the energy store 54 in this situation, the protective switch 69 is closed and electrical energy with the voltage of 400 V is transformed to the voltage of 800 V by the voltage transformer 62, 92. This electrical energy is transmitted to the energy store 54 by the voltage transformer 62, 92. If the charging station already has the voltage of 800 V, the protective switch 69 is opened and disconnected from the charging socket 60 and from the charging station. Electrical energy then can be transported directly to the energy store 54 from the charging socket 60 via lines (not illustrated) while bypassing the voltage transformer 62, 92.

Figure 5:
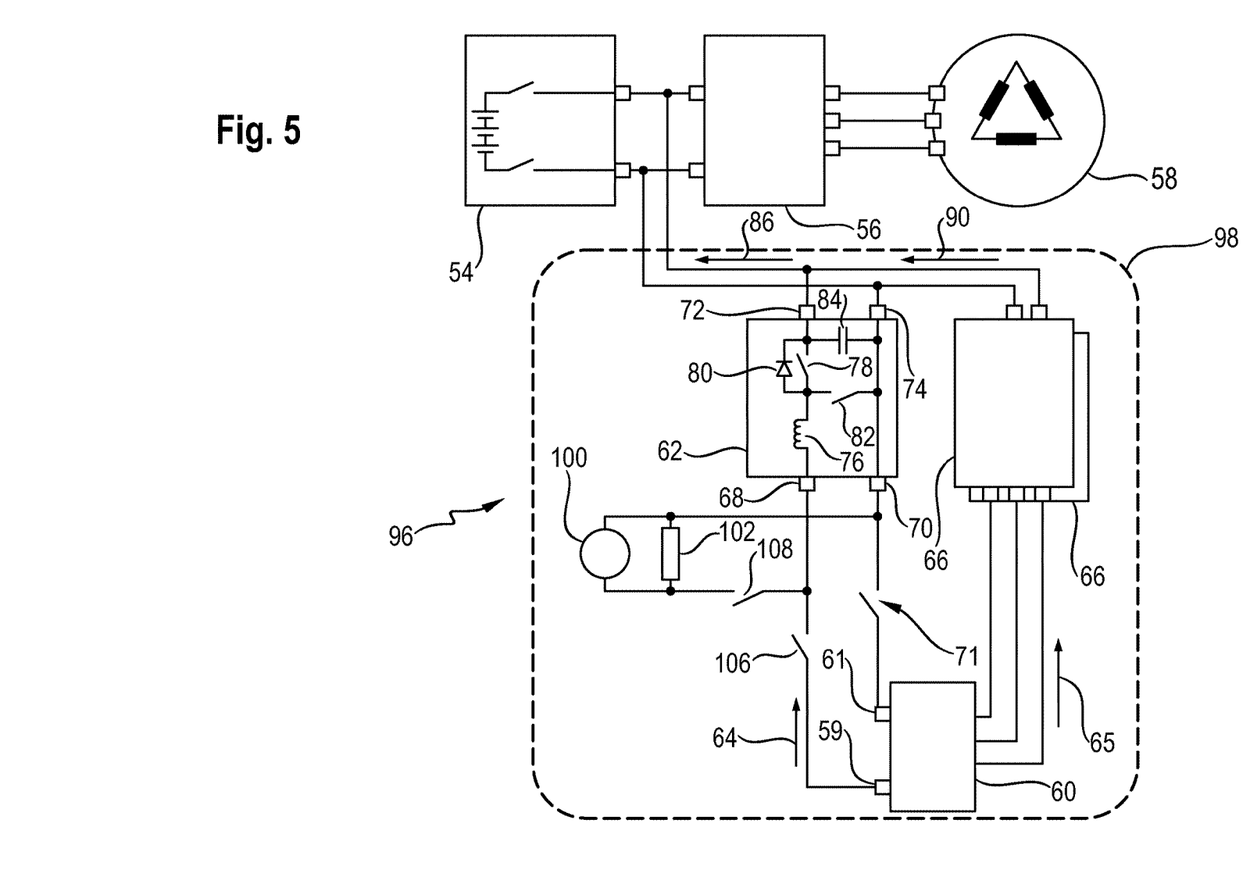
FIG. 5 is a schematic illustration of a second example of an arrangement for a motor vehicle with a second embodiment of the energy supply system according to the invention.
Figure 6A:
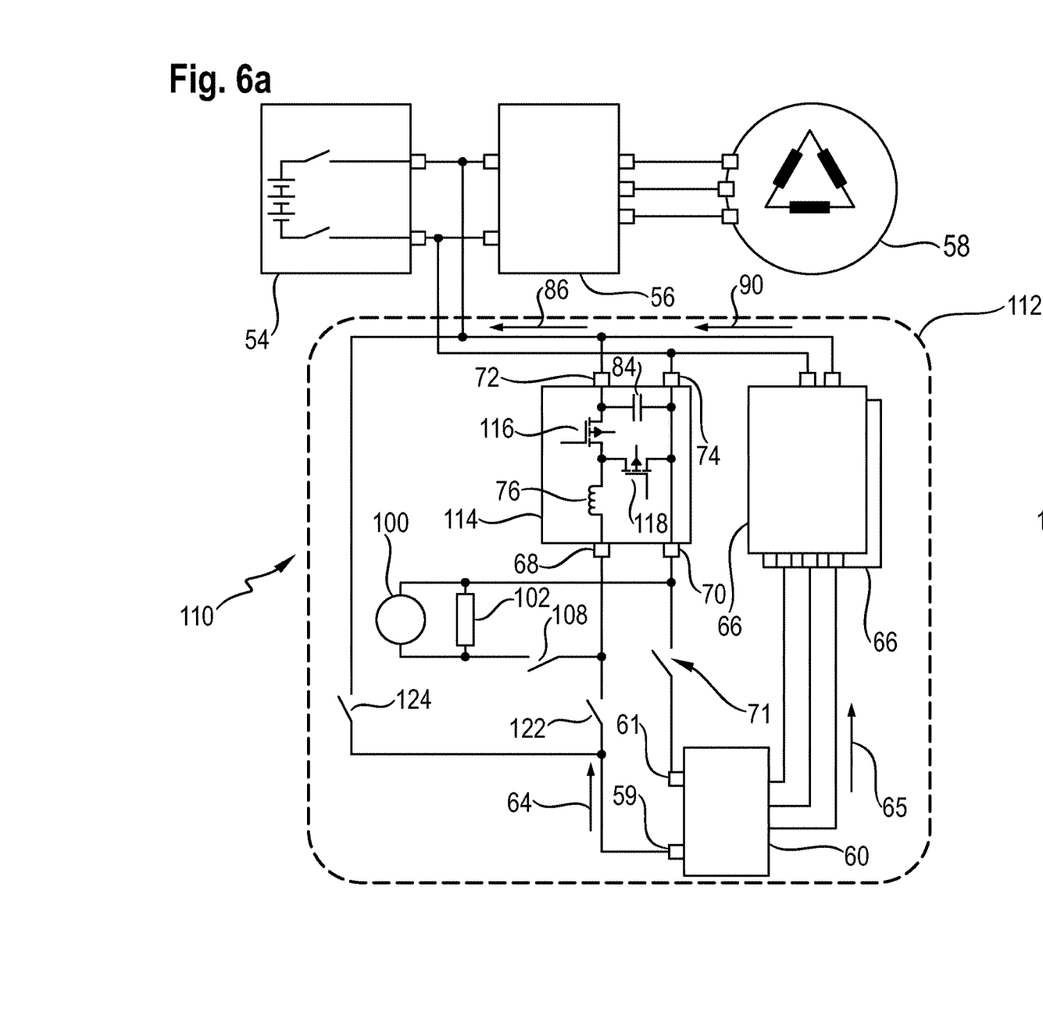
FIGS. 6a and 6b are schematic illustrations of a third example of an arrangement for a motor vehicle having a third embodiment of the energy supply system according to the invention.

The second example of the motor vehicle arrangement 96 is illustrated schematically with reference to FIG. 5 and, like the first arrangement 50 in FIG. 4a, has an electrical energy supply system 98 that differs from the energy supply system 52 in FIG. 4a only in having additional lines with which it can be connected to further components, usually consumers of the motor vehicle, specifically an air-conditioning processor 100 and a heating device 102 with a PTC resistor. The air-conditioning processor 100 and the heating device 102 are connected in parallel with one another and are to be operated at the second, low voltage or voltage level of 400 V.

The energy supply system 98 has a first protective switch 106, which is electrical and/or mechanical, arranged along a line between the first output 59 (positive pole) of the charging socket 60 and the first input 68 of the voltage transformer 62. A first additional line branches off at a node between the first protective switch 106 and the first input 68 to the air-conditioning processor 100 and the heating device 102 has a second protective switch 108, which is electrical and/or mechanical here. Furthermore, a second line to the air-conditioning processor 100 and to the heating device 102 branches off at a node along a line between the second output 61 (negative pole) of the charging socket 60 and the second input 70 of the voltage transformer 62. A further optional electrical and/or mechanical protective switch 71 is arranged along this second line. The protective switch 71 can close or open the second line to transport current between the second output 61 and the second input 70.

In a variant of the embodiment of the energy supply system 98 shown here it is conceivable to replace the voltage transformer 62 by the voltage transformer 92 with the additional semiconductor switch 94 from FIG. 4b.

The second embodiment of the electrical energy supply system 98 enables the air-conditioning processor 100 and the heating device 102 to be used as additional consumers in the motor vehicle that are to be operated only at the second, low voltage of 400 V. However, other components of the motor vehicle, specifically the electrical energy store 54, the power electronics 56 and the electric machine 58 each have the first, high voltage of 800 V.

In a travel mode of the motor vehicle, the first protective switch 106 of the energy supply system 98 is open, whereas the second protective switch 108 is closed. It is therefore possible to transport electrical energy as direct current from the electrical energy store 54 with the first, high voltage of 800 V to the voltage transformer 62, which is embodied here in a bidirectional fashion. Thus, the electrical energy is transformed to the low, second voltage of 400 V by the bidirectional voltage transformer 62 and made available to the air-conditioning processor 100 and the heating device 102.

The arrangement 96 and the energy supply system 98 make it possible to carry out different variants of a charging mode. If the charging socket 60 is connected to a charging station that makes available current with a voltage of 400 V, it is possible to close both protective switches 106, 108 and therefore supply the air-conditioning processor 100 and the heating device 102 with electrical energy. It is therefore possible to pre-condition the air-conditioning processor 100 and the heating device 102, wherein the energy store 54 of the motor vehicle has to be cooled during the charging process using, for example, the air-conditioning processor 100. Furthermore, current is transported to the first input 68 of the voltage transformer, is transformed from the second voltage to the first voltage and is made available to the electrical energy store, as indicated by arrow 86.

Quick charging of the electrical energy store 54 with current at the first high voltage of 800 V from the charging station via the charging socket 60 may be provided. In this situation, the protective switches 71, 106 between the charging socket 60 and the voltage transformer 62 are closed and the second protective switch 108 is opened to protect the air-conditioning processor 100 and the heating device 102. As a result, the electrical current can be transported from the charging socket 60 to the electrical energy store 54 via the voltage transformer 62. In this case, the air-conditioning processor 100 and the heating device 102 are switched to a voltage-free state on the basis of the open second protective switch 108.

If, with this refinement of the arrangement 96, there is provision also to supply the two consumers, i.e. the air-conditioning processor 102 and the heating device 104 with electrical energy at the second, lower voltage, the protective switches 71, 106 are opened and the protective switch 108 is closed. Current that has the second, now reduced voltage, then is made available to the consumers by the energy store 54 via the voltage transformer 62.

The voltage transformer 92 of FIG. 4b with the additional semiconductor switch 94 may be used in the energy supply system 98 instead of the voltage transformer 62 shown in FIG. 5. This embodiment increases the safety of use of the motor vehicle and can prevent the motor vehicle from becoming immobile.

The third example of the motor vehicle arrangement 110 illustrated schematically in FIG. 6a differs from the arrangements in FIG. 4a and FIG. 5 in having a third embodiment of an electrical energy supply system 112 with a further variant of a voltage transformer 114 that differs from the variants of the voltage transformers 62 and 92 presented in FIGS. 4a, 4b and 5.

A first field-effect transistor 116 instead of the semiconductor switch 78 and the diode 80 is arranged along a first path of the voltage transformer 114 between a first input 68 and a first output 72 in the voltage transformer 114 next to the coil 76 as an active switching element. Furthermore, instead of the second semiconductor switch 82, a second field-effect transistor 118 is arranged as an active switching element between this first path and the second path of the voltage transformer 114, which extends here between the second input 70 and the second output 74.

Figure 6B:
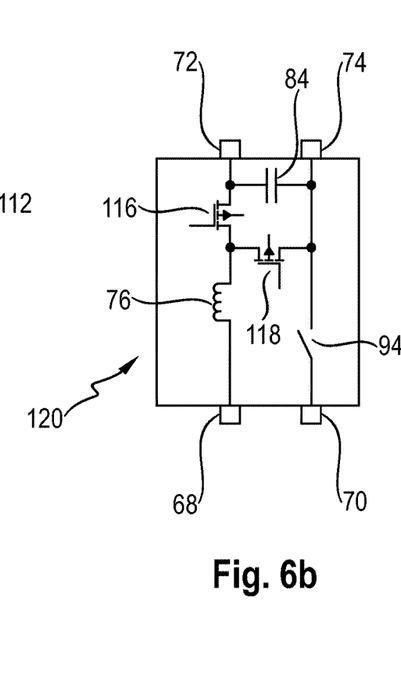

The voltage transformer 120 illustrated in FIG. 6b can be used in the energy supply system 112 as an alternative to the voltage transformer shown in FIG. 6a. The voltage transformer 120 differs from the voltage transformer 114 of FIG. 6a by having the additional optional semiconductor switch 94 as an active switching element along the second path.

All the variants of the voltage transformer 60, 92, 114, 120 that are presented can be interchanged for all the embodiments of the energy supply systems 52, 98, 112 that are presented.

The third embodiment of the energy supply system 112 from FIG. 6a, like the second embodiment of the energy supply system 98 from FIG. 5, not only has the line between the air-conditioning processor 100 and the heating device 102, and the node along the line between the second input 70 of the voltage transformer 114 and the second output 61 of the charging socket 60, but also a line via which this energy supply system 112 can be connected directly to the air-conditioning processor 100 and the heating device 102 as further components of the motor vehicle. Thus, the air-conditioning processor 100 and the heating device 102 are connected in parallel with one another and to a protective switch 108 via a node with a line between the first output 59 of the charging socket 60 of the energy supply system 112 and the first input 68 of the voltage transformer 114.

In contrast to the embodiment of FIG. 5, a first electrical and/or mechanical protective switch 122 is arranged along the line between the first output of the charging socket 60 and the first input 68 of the voltage transformer 114. This first protective switch 122 is located between the charging socket 60 and a node at which the line branches off to the air-conditioning processor 100 and the heating device 120. Furthermore, another node is arranged between the first output 59 of the charging socket 60 and the first protective switch 122, via which node a direct line can be made available from the first output 59 of the charging socket 60 to the electrical energy store 54 of the motor vehicle if a second electrical and/or mechanical protective switch 124 along this line is closed. Therefore, if the charging socket 60 is connected to a charging station that makes available current with the first, high voltage of 800 V, it is possible to transport this current directly to the electrical energy store 54 via the, closed, second protective switch 124.

If, during a charging process or charging mode, the charging socket 60 is connected to a charging station which makes available current with a voltage of 400 V, it is possible, by closing the first protective switch 122 and opening the second protective switch 124, to transport current with the second, relatively low voltage of 400 V both to the voltage transformer 114 and to the air-conditioning processor 100 as well as to the heating device 102. As already described above, the current with the second voltage is to be transformed by the voltage transformer 114 to the current with the first voltage and to be made available to the electrical energy store 54 of the motor vehicle.

Furthermore, this current, which has the second, low voltage of 400 V, from the charging socket 60, can continue to be transported, when the first protective switch 122 is closed, so that the air-conditioning processor 100 and the heating device 102 can also be operated during the charging mode.

In addition, it is possible, in the third embodiment of the electrical energy supply system 112, to integrate an additional protective switch 108, as shown in FIG. 5. As result, the air-conditioning processor 100 and the heating device 102 are to be disconnected from the charging socket 60 even when the protective switch 122 is closed.

The electrical and/or mechanical protective switch 69, 71, 106, 108, 122, 124 in the embodiments of the energy supply system 52, 98, 112, make it possible to use additional components of the motor vehicle, for example, the air-conditioning processor 100 and the heating device 102, that are to be operated at the second, low voltage of 400 V, and which therefore do not have to be re-designed or made available for the first, high voltage of 800 V.

The first path between the first input 68 and the first output 72 is to be deactivated electronically by the variants of the voltage transformers 92, 120 in FIGS. 4b and 6b. Thus, the respective motor vehicle is prevented from becoming immobilized and its safety of use is to be increased. The additional semiconductor switch 94 enables the second path between the second input 70 and the second output 74 to be deactivated in the respective voltage transformer 92, 120. The current through both paths can therefore be deactivated redundantly.

By taking into account currently (2015) provided standards IEC 61851-1, -21, -22, -23, ISO FDIS 17409 it is conceivable that it is possible to ensure deactivation of a charging line and contact protection on a charging socket 60 even via additional protective switches, for example main protective switches, in the electrical battery store. Since the main protective switches must not be closed in the electrical energy store 54, it is conceivable that from the point of view of use safety a protective adhesive can cause the motor vehicle to become immobilized. What is referred to as a simple ISO error can be caused by soiling of the charging socket 60 and can give rise to a warning message.

Figure 7:
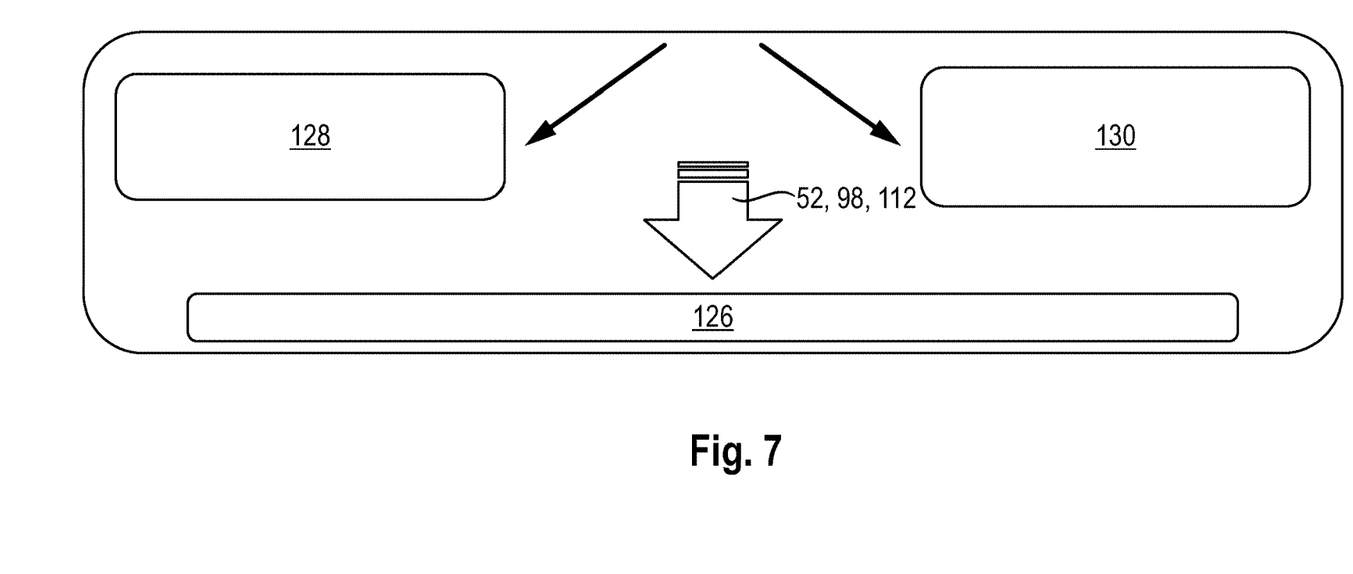
FIG. 7 is a schematic illustration of a first diagram for carrying out an embodiment of the method of the invention.

Reference is made to FIG. 7 with respect to the execution of the embodiment of the method according to the invention. In this context, by using an energy supply system 52, 98, 112 it is possible, as presented in FIGS. 4 to 6, to charge components 126 of a motor vehicle both via a first variant of a charging station 128 with a first, high voltage of 800 V, as well as via a second variant of a charging station 130 with a second, low voltage of 400 V. The second variant of the charging station 130 can make available currents up to 350 A due to an extendable plug topology for the second, low voltage of 400 V, so that a current limit is to be widened when the embodiment of the method is implemented. In the first variant of a charging station 128 at the first, high voltage, currents with a voltage of 800 V and a current strength of up to 200 A can be made available. Furthermore, a voltage level or voltage range can be extended up to a maximum of 1000 V. Power levels can reach values of up to 160 kW. For a component 126 of the motor vehicle, a charging power of up to 250 kW can therefore be reached by combining an increase in the current and an increase in the voltage.

When an embodiment of the method is carried out and an embodiment of an energy supply system 52, 98, 112 is used, it is possible also to supply components 126 of the motor vehicle which have different voltages with electrical energy at the same time.

Figure 8:
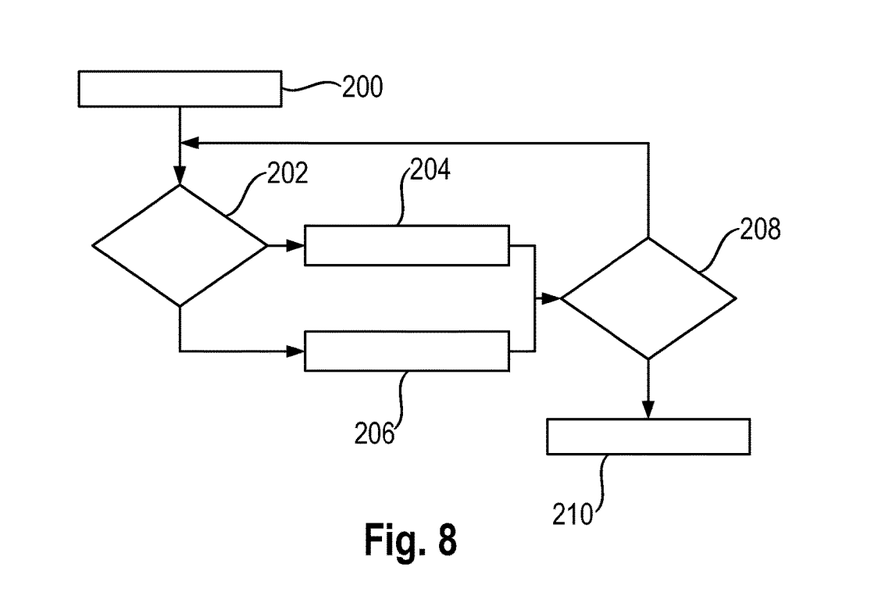
FIG. 8 is a schematic illustration of a second diagram for carrying out an embodiment of the method of the invention.

The embodiment of the method described in the diagram in FIG. 8 relates to charging of an electrical energy store 54 of a motor vehicle, which energy store 54 is to be connected to a charging station via a voltage transformer 62, 92, 114, 120 and a charging socket 60. This embodiment of the method is started in a first step 200 with a charging request.

A second step 202 checks whether a voltage of the energy store 54 is lower than a maximum voltage of the charging station or not. If the voltage of the energy store 54 is lower than that of the charging station (yes), the energy store 54 is charged directly in a third step 204. In this context, the current is conducted directly past the voltage transformer 62, 92, 114, 120 to the energy store 54. However, if it becomes apparent in the second step 202 that the voltage of the energy store 54 is higher than or equal to the maximum voltage of the charging station, the energy store 54 is charged from the charging station via the voltage transformer 62, 92, 114, 120 in an alternative fourth step 206.

In the case of the third embodiment of the energy supply system 112, there is provision in this respect that the protective switches 71, 122 are opened and the second protective switch 124 is closed if the current from the charging station and the charging socket 60 is conducted directly to the energy store 54. However, if the energy store 54 is to be charged via the voltage transformer 114, 120, the protective switches 71, 122 are closed, whereas the protective switch 124 is opened. In this context, the energy store 54 is charged to the voltage of the energy store 54 via the voltage transformer 62, 92, 114, 120.

During the charging of the energy store 54 via the voltage transformer 62, 92, 114, 120, a current voltage of the energy store 54 is increased successively according to a respective current state of charge (SOC) of the energy store 54.

In this context it is possible that depending on the current ratio of the voltage of the energy store 54 to the charging station, which can be checked regularly in the second step 202, a changeover between the third step 204 and the fourth step 206 is carried out. Furthermore, in a fifth step 208 it is checked whether the energy store 54 is completely charged or not. If this is the case (yes), the method is ended in a concluding, sixth step 210. If the energy store 54 is not yet completely charged (no), the method is continued with the second step 202, starting from the fifth step 208.

Figure 9:
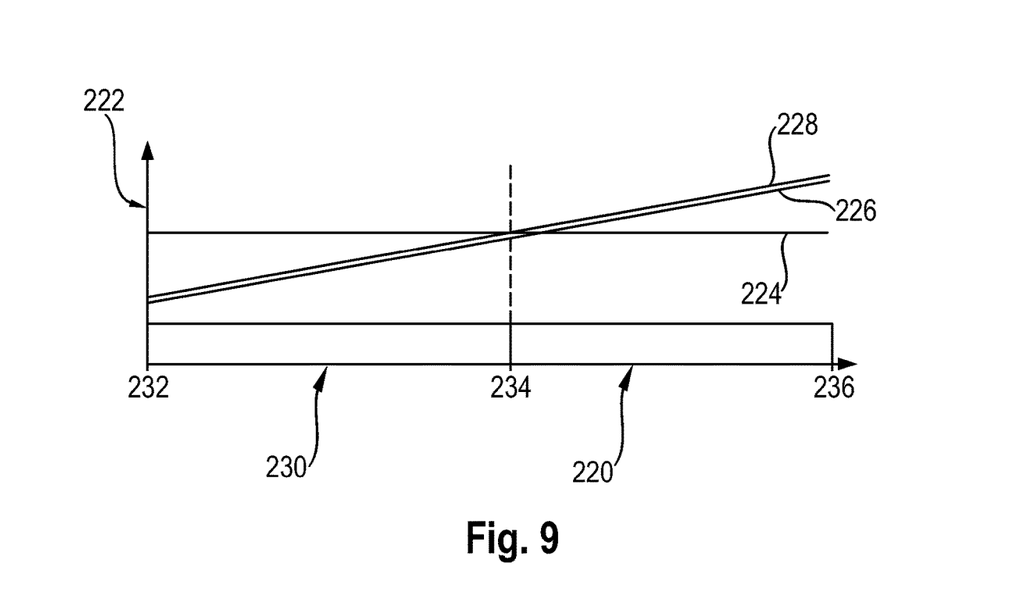
FIG. 9 is a schematic illustration of a third diagram for carrying out an embodiment of the method of the invention.

The diagram from FIG. 9 comprises an abscissa 220, along which the time is plotted. The voltage is plotted along an ordinate 222 of this diagram. A first straight line 224, which is arranged parallel to the abscissa 220, indicates a constant value of a maximum voltage of the charging station. A second straight line 226 indicates a voltage of the energy store 54 which is time-dependent within the scope of the method. A third straight line 228 is arranged parallel to this second straight line 226, said third straight line 228 indicating a time-dependent voltage with which electrical energy is or is made available to the energy store 54. In this context, this voltage which is provided for charging is slightly higher than that of the energy store 54.

Furthermore, a first time interval 230, which extends from a first time 232 at the start of a charging process up to a second time 234 during the charging process, is indicated along the abscissa 220. In this context there is provision that the voltage which is indicated by the third straight line 228 is lower than the maximum voltage of the charging station. When the method is carried out, electrical energy is charged directly into the energy store 54 from the charging socket 60, wherein the voltage transformer 62, 92, 114, 120 is deactivated. As soon as the voltage (third straight line 228) for charging the energy store 54 is higher than the maximum voltage of the charging station, the voltage transformer 62, 92, 114, 120 is activated starting from the second time 234, and electrical energy is transformed from the low voltage of the charging station to the relatively high voltage of the energy store 54. The method is concluded at a third time 236 at which the energy store 54 is completely charged.

Within the scope of the method, two voltages of different magnitude or level are taken into account, said voltages usually varying in a voltage range from, for example, at least approximately 100 V to approximately 1000 V. In one refinement, the lower of the two voltages has a value starting from 200 V, usually 400 V up to 600 V. In contrast, the higher of the two voltages has a value starting from 600 V, usually 800 V to 1000 V.

What is claimed is:

1. An energy supply system for supplying at least first and second components of a motor vehicle with electrical energy, the energy supply system being arranged in the motor vehicle and having a charging socket and at least one voltage transformer, the at least one first component being an energy store and the at least one second component being a consumer, the at least one first component having a first electrical voltage and the at least one second component having a second electrical voltage, the at least one voltage transformer configured to transform current from one of the two voltages to the other voltage, and vice versa, the at least one voltage transformer having a first input, a first output, a second input and a second output, wherein the first input and the first output are connected to one another via a first path, and the second input and the second output are connected to one another via a second path, a coil and a first active switching element being arranged along the first path, and the first and second paths being connected to one another via a second active switching element and a capacitor, the charging socket being selectively connected to a charging station with which current of either the first or the second electrical voltage is made available to carry out a charging mode, wherein in the event of the charging station having the first electrical voltage, the energy supply system, in a first charging mode, transmits current from the charging socket to the at least one first component, and wherein in the event of the charging station having the second electrical voltage, the energy supply system transforms current from the charging socket from the second electrical voltage to the first electrical voltage and transmits the current to the at least one first component, and wherein the energy supply system is designed to transmit the current from the charging socket on to the at least one second component, wherein the energy supply system, in a travel mode of the motor vehicle, transforms current from the at least one first component from the first electrical voltage to the second electrical voltage and transmits current to the at least one second component.

2. The energy supply system of claim 1, further comprising a third active switching element arranged along the second path.

3. The energy supply system of claim 1, wherein at least one of the active switching elements is a semiconductor switch.

4. The energy supply system of claim 1, wherein the first input of the at least one voltage transformer is connected via a first line to a first output of the charging socket, and the second input of the at least one voltage transformer is connected via a second line to a second output of the charging socket, and wherein the outputs of the at least one voltage transformer are connected via at least one further line to the at least one first component of the motor vehicle.

5. The energy supply system of claim 4, wherein the first line has a first node via which the first line is connected to the at least one second component, and wherein the second line has a node via which the second line is connected to the at least one second component, a protective switch being arranged between the first output of the charging socket and the first node along the first line.

6. The energy supply system of claim 5, further comprising a protective switch between the first node along the first line and the at least one second component.

7. The energy supply system of claim 4, wherein the first line has a second node via which the first line is connected to the at least one first component, and a protective switch being arranged between the second node and the at least one first component and via which the at least one first component is connected directly to the charging socket.

8. The energy supply system of claim 1, wherein at least one charging device which is arranged between the charging socket and the at least one first component.

* * * * *